United States Patent

Korolenko

[11] Patent Number: 6,052,335
[45] Date of Patent: Apr. 18, 2000

[54] MULTIPLE-FREQUENCY SONAR SYSTEM

[75] Inventor: Kyrill V. Korolenko, Portsmouth, R.I.

[73] Assignee: The United States of America as represented by the Secretary of the Navy, Washington, D.C.

[21] Appl. No.: 09/152,473

[22] Filed: Sep. 9, 1998

[51] Int. Cl.[7] ........................................... G01S 3/80
[52] U.S. Cl. .................................................. 367/121
[58] Field of Search .......................... 367/92, 103, 105, 367/119, 121, 188, 124, 126

[56] References Cited

U.S. PATENT DOCUMENTS 5,034,931   7/1991   Wells ................................. 367/126

Primary Examiner—Daniel T. Pihulic
Attorney, Agent, or Firm—Michael J. McGowan; Prithvi C. Lall; Michael F. Oglo

[57] ABSTRACT

A hull-mounted, multiple-frequency sonar system having a primary transducer, which provides transmission power for active modes and an added array of miniature hydrophones is provided. The multiple frequency sonar system includes vertical and horizontal arrays of miniature hydrophones connected by a multiplexer to four beamformer components. These beamformers process data received by acoustic intercept signals, passive signals, active fundamental frequency signals, and active second-harmonic frequency signals. Signal processing and display is available from each of the beamformers and an additional mode is provided wherein fundamental and second harmonic frequency data is combined and then displayed.

20 Claims, 4 Drawing Sheets

MULTIPLE-FREQUENCY SONAR SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention described herein relates to sonar systems and in particular to sonar signal detection and processing.

(2) Description of the Prior Art

Hull-mounted sonar systems typically include both active and passive systems and may have one or two transducers. Often a second transducer is used to produce low frequency, long range detection. The resolution achievable using hull-mounted transducers is relatively coarse. A target may, for example, provide an enlarged return (due to the lack of resolution) which thereby diminishes the accuracy of azimuth information and, to a lesser extent, the accuracy of range information. Further, small targets, such as submerged mines may be undetectable due to the lack of resolution. In an effort to improve resolution, towed arrays are often added to a ship's sonar system. Such a towed array can use the transmissions of the hull-mounted system for active operations, or transmissions from other sources for passive operations. A difficulty remaining with the towed array, however, is the requirement to stabilize the array during operation. This requirement means that the ship must maintain a relatively non-maneuvering course during sonar operations. Due primarily to the threat of torpedo attack, standard procedure is to sail a series of randomly-timed, zigzag courses, as a defensive measure. This procedure prevents stabilization of towed-array sonars, thereby creating a need for hull-mounted systems which can provide towed array capabilities.

SUMMARY OF THE INVENTION

Accordingly, it is an object of the invention to provide a sonar system having an array receiving both a fundamental frequency and a harmonic frequency.

It is another object of the invention to provide a sonar system having a towed-array level of performance while attached to a ship conducting evasive and defensive maneuvers.

Yet another object of the invention is to provide a sonar system attached to a ship's hull having improved resolution.

In accordance with these and other objects, the invention is a sonar system having an array of miniature hydrophone elements. The hydrophone elements are spaced in vertical and horizontal positions at one-half the wavelength of the second harmonic frequency of the sonar transmitted frequency. In a typical installation, the array is attached to an existing rubber sonar window in a ship's hull. The electronic implementation of the invention comprises a multiplexer connecting the miniature hydrophones to a series of beamformers. These beamformers provide for reception of acoustic intercept, passive signals, active fundamental frequencies, and active harmonic frequencies. The output of each beamformer is then processed and thereafter directed to a display or other ship's systems.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
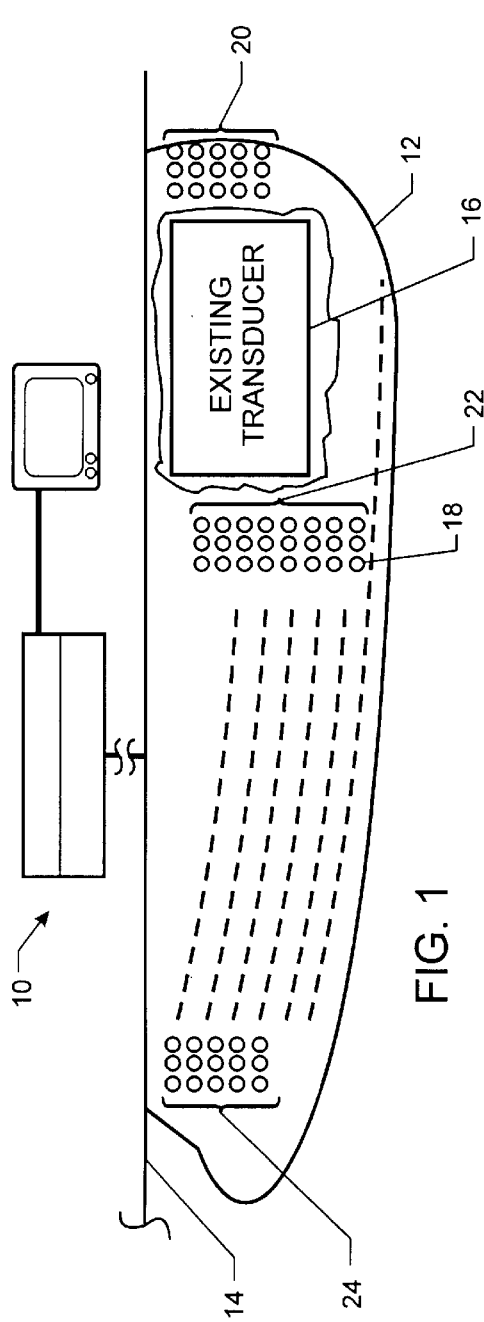
FIG. 1 is a side view of a sketch of a typical existing rubber sonar window showing the existing sonar transducer and locations of the new hydrophone elements of the present invention.

Referring now to FIG. 1, the multiple-frequency sonar system, designated generally by the reference numeral 10, is shown in a typical installation using an existing rubber sonar window 12 on a ship's hull 14. The multiple-frequency sonar system uses a primary transducer 16 to provide transmit power in all active modes. The miniature hydrophones 18, which provide data to the beamformers and other processing components of the system, are formed in five arrays located on the inner surface of the sonar window, a forward array 20, center side arrays 22 and aft side arrays 24 on both sides of the sonar window.

Figure 2:
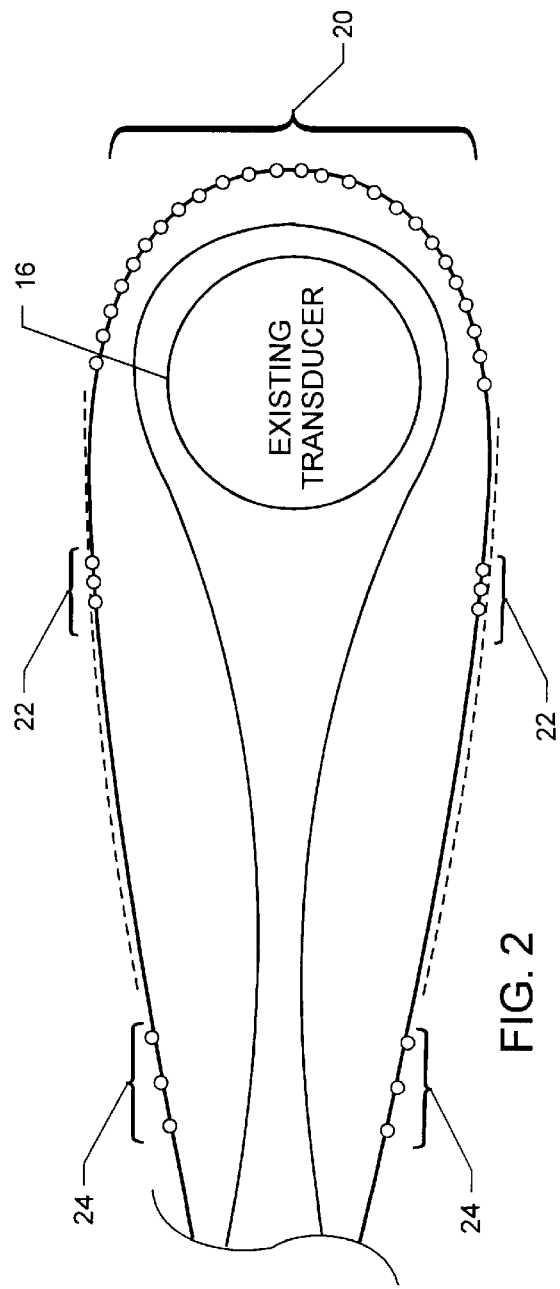
FIG. 2 is a top view of the rubber sonar window showing the existing sonar transducer and locations of the new hydrophone elements of the present invention.
Figure 3:
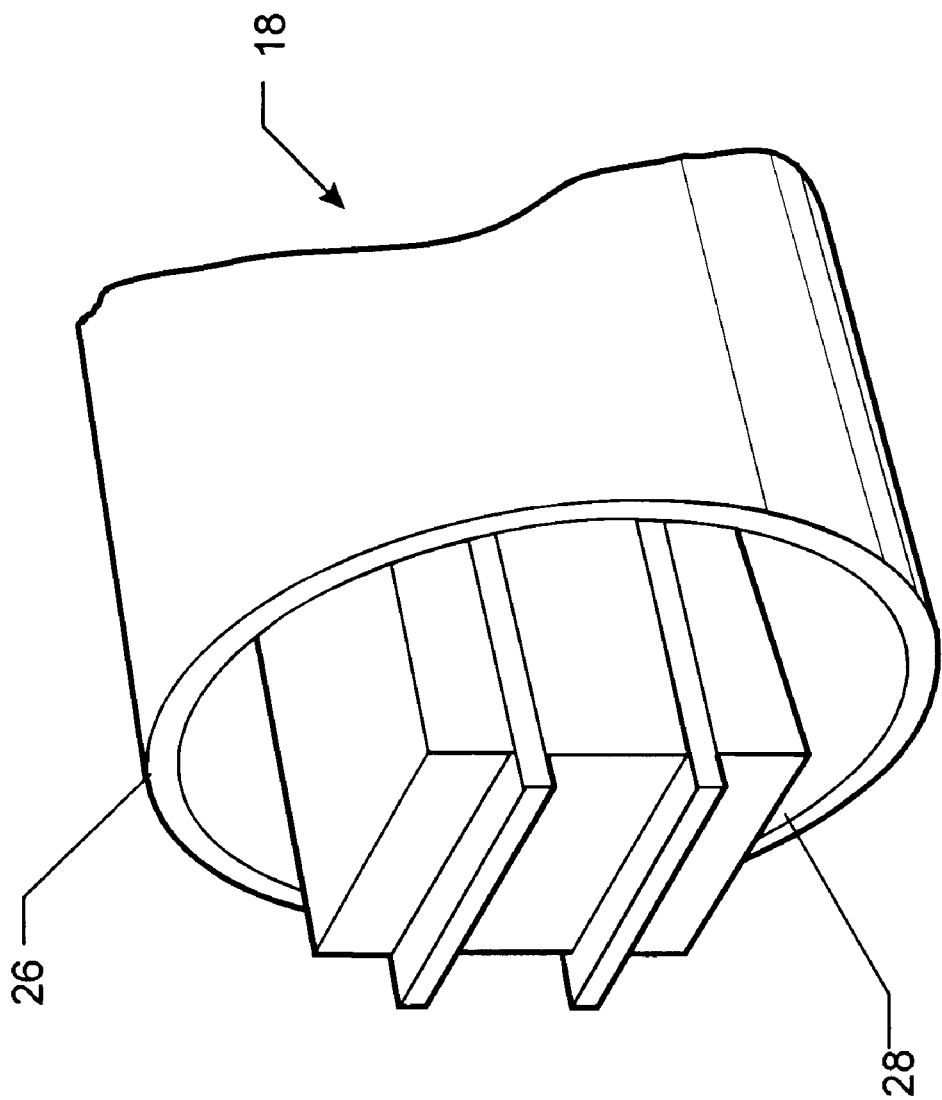
FIG. 3 is a perspective view of the miniature transducer used as elements in the array of the invention.

As shown in FIG. 2, the forward array 20 extends around the forward portion of sonar window providing improved directivity response to the array. FIG. 3 shows a perspective of the miniature hydrophones 18, which form the elements of the array. The hydrophone depicted is approximately ½ inch thick and has a diameter in the range of 0.8 to 1.2 inches. The hydrophone 18 includes a diaphragm 26 and a miniaturized transducer 28 along with associated structure.

Figure 4:
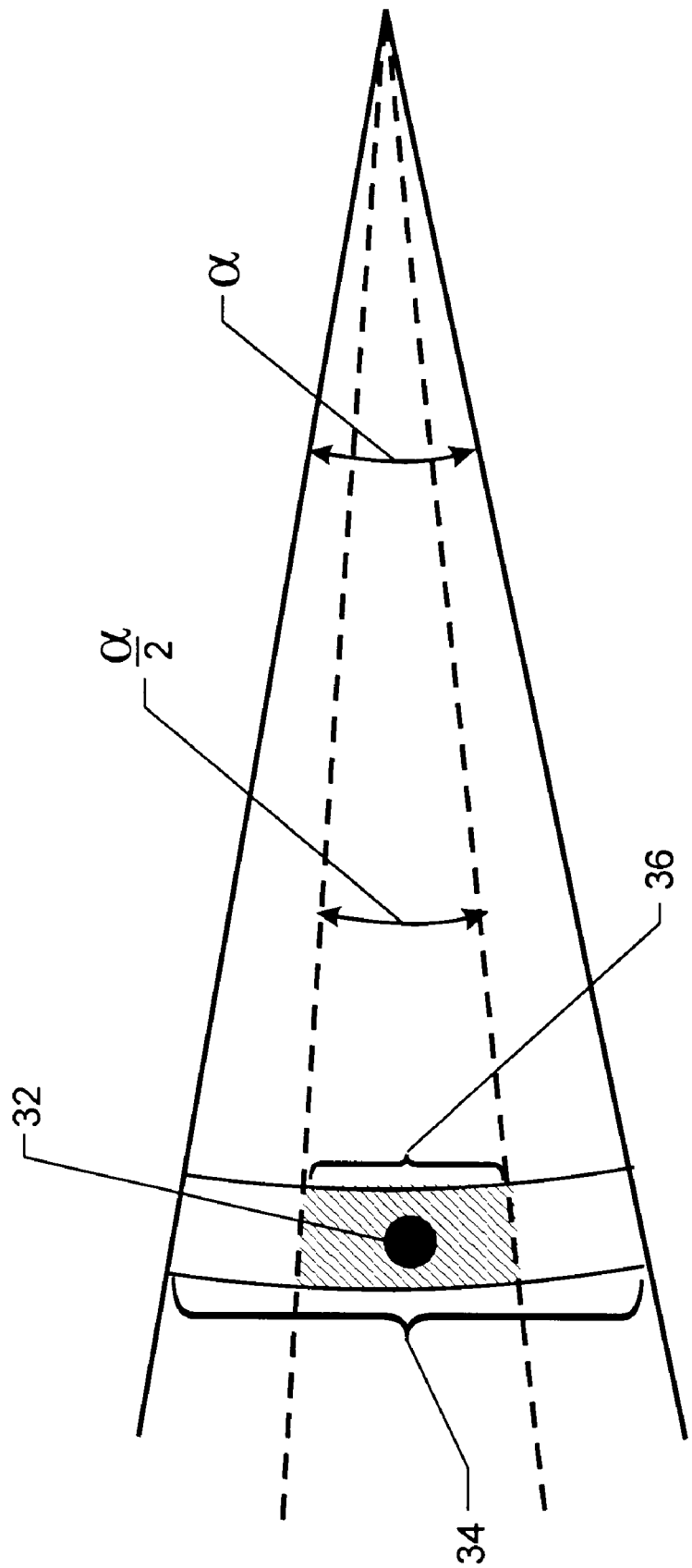
FIG. 4 is a schematic depicting target resolution at the fundamental frequency, $\alpha$, and at the second harmonic frequency, $\alpha/2$.

By use of the second harmonic (having a frequency twice the fundamental frequency), greater resolution is achieved due to the shorter wavelength. FIG. 4 shows the comparative resolutions of the fundamental frequency, $\alpha$, and the second harmonic frequency, $\alpha/2$. The target 32 returns an echo covering the arc 34 at the fundamental frequency $\alpha$, but returns a smaller arc, arc 36 at the frequency of second harmonic.

Figure 5:
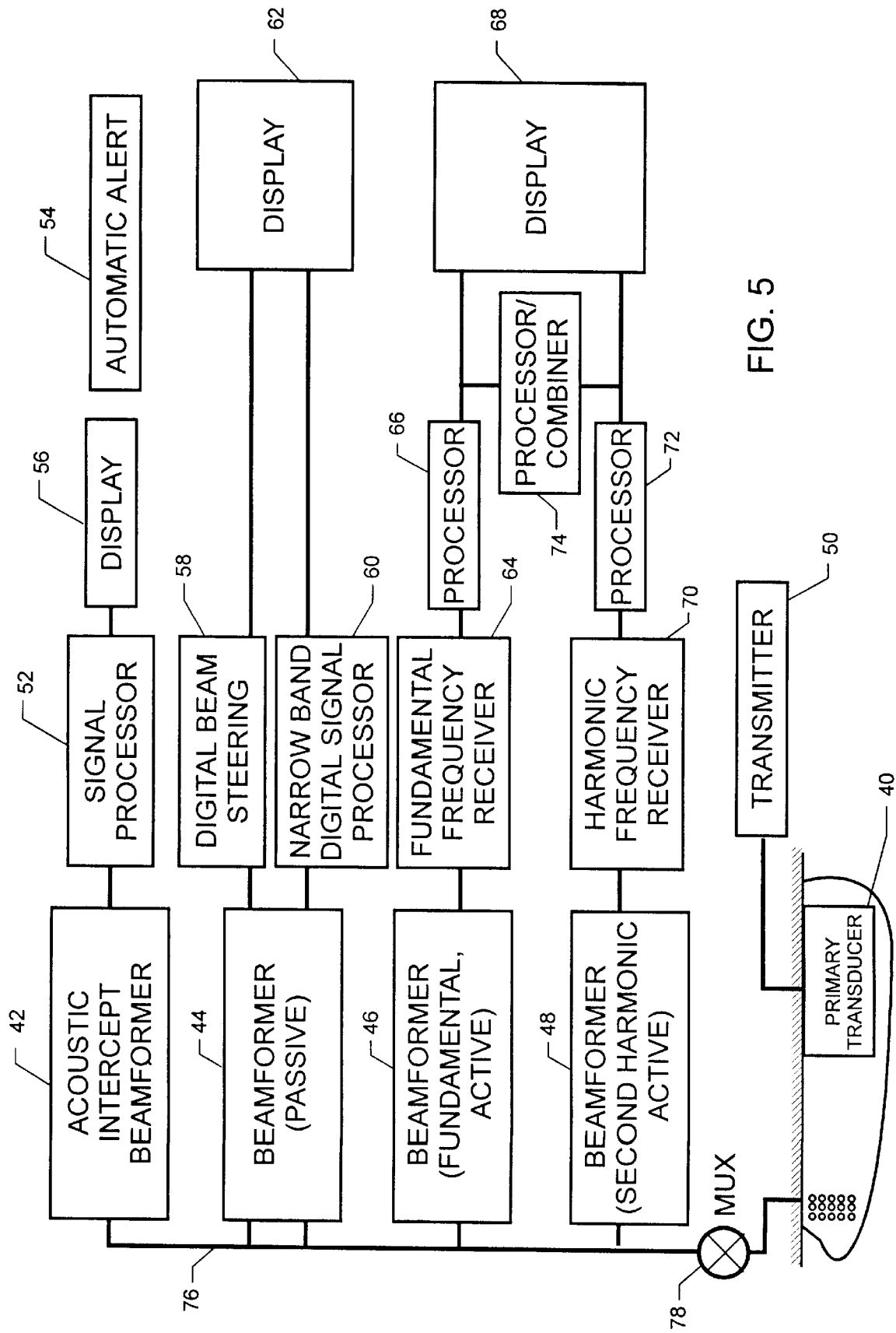
FIG. 5 is a block diagram depicting the signal processing implementation of the invention.

Referring now to FIG. 5, the block diagram depicts the implementation of the multiple-frequency system of the subject invention. The primary transducer 40 and the transmitter 50 may be shared components when the invention is retrofitted as a modification of an existing sonar system. The multiple-frequency sonar system 10 uses a plurality of beamformers to cover a spectrum of target signal returns. These beamformers include (1): an acoustic-intercept beamformer 42 to detect and track noises emitted by a target; (2): a passive beamformer 44 to detect and track returns from a target which has been illuminated by another transmitter; (3): a fundamental frequency beamformer 46 to detect and track returns generated by illumination of a target with the fundamental frequency of transmitter 50; and (4): a second harmonic beamformer 48 to detect and track target returns in a second harmonic frequency generated by the transmitter 50, each of these beamformers are connected by data bus 76 through multiplexer 78 to the plurality of miniature hydrophone arrays.

The acoustic intercept beamformer 42 feeds a digital signal processor 52, which, in turn, feeds an automatic alert unit 54 and a display unit 56.

In the passive beamformer implementation, the passive beamformer 44 feeds in parallel a digital beam steering processor 58 and a narrow-band digital signal processor 60. The outputs of the beam steering processor 58 and the narrow-band digital signal processor 60 are fed to a display unit 62.

Two beamformers are used to track active signals (signals returned from transmissions by the transmitter 50). A fundamental frequency beamformer 46 feeds a fundamental frequency receiver 64, which, in turn, feeds a signal processor 66 and a display unit 68. The second harmonic beamformer 48 feeds second harmonic receiver 70 which, in turn, feeds a signal processor 72 and also feeds the display unit 68. Output from both signal processor 66 and signal processor 72 is also fed to a processor/combiner 74 for refinement of target azimuth and resolution and for further display on display unit 68.

The new features and advantages of the invention are numerous. The integration of second harmonic with existing active sonars provides improved directivity gain (on the order of 6–9 db); better resolution (~3 db); improved resolution through the combination of fundamental and second harmonics (~3 db), thereby providing an overall performance improvement of 12–15 db. The overall performance improvement is important for detection of small targets, such as underwater mines and for weapons aiming for now developing underwater guns and projectiles. Additionally, the current active Anti-Submarine Warfare (ASW) sonar already transmits high power level harmonics. The power levels of the harmonics are on the order of some older sonar systems. As a result, no additional transmission or power is required. The signal available from the second harmonic already exists and need only be collected.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A multiple-frequency sonar system comprising:
   a hull-mounted sonar window having an inner surface and an outer surface;
   a plurality of hydrophone arrays attached to the inner surface of said sonar window;
   a primary transducer located within said sonar window;
   a plurality of beamformer and processing components connected to said plurality of hydrophone arrays; and
   a plurality of display units connected to said plurality of beamformer and processing components.

2. A multiple-frequency sonar system as in claim 1 wherein said hull-mounted sonar window is a rubber sonar window.

3. A multiple-frequency sonar system as in claim 1 wherein said plurality of hydrophone arrays comprise five hydrophone arrays mounted on a forward end and on both center side sections and both aft side sections of said sonar window.

4. A multiple-frequency sonar system as in claim 1 wherein said plurality of hydrophone arrays comprises a plurality of arrays containing miniature hydrophones having a diameter in the range of 0.8 to 1.2 inches.

5. A multiple-frequency sonar system as in claim 1 wherein said plurality of beamformer and processing components are connected to said plurality of hydrophone arrays, a multiplexer and data bus.

6. A multiple-frequency sonar system as in claim 1 wherein said beamformer and processing components further comprises an acoustic-intercept beamformer.

7. A multiple-frequency sonar system as in claim 6 wherein said acoustic-intercept beamformer is connected to a signal processor which is in turn connected to a display unit.

8. A multiple-frequency sonar system as in claim 7 wherein said signal processor is connected to an automatic alarm.

9. A multiple-frequency sonar system as in claim 1 wherein said beamformer and processing components further comprises a passive signal beamformer.

10. A multiple-frequency sonar system as in claim 9 wherein said passive signal beamformer is connected to a digital beam steering processor.

11. A multiple-frequency sonar system as in claim 9 wherein said passive signal beamformer is connected to a narrow-band digital signal processor.

12. A multiple-frequency sonar system as in claim 10 wherein said digital beam steering processor is further connected to a display unit.

13. A multiple-frequency sonar system as in claim 11 wherein said narrow-band digital signal processor is further connected to a display unit.

14. A multiple-frequency sonar system as in claim 1 wherein said beamformer and processing components further comprises a fundamental frequency active beamformer.

15. A multiple-frequency sonar system as in claim 14 wherein said fundamental frequency active beamformer is connected to a fundamental frequency receiver which is connected, in turn, to a signal processor and thereafter to a display unit.

16. A multiple-frequency sonar system as in claim 1 wherein said beamformer and processing components further comprises a second harmonic active beamformer.

17. A multiple-frequency sonar system as in claim 16 wherein said harmonic active frequency beamformer is connected to a harmonic frequency receiver which is connected, in turn, to a signal processor and thereafter to a combiner/processor and to a display unit.

18. A multiple-frequency sonar system comprising:
   a rubber sonar window having an inner surface and an outer surface;
   a plurality of hydrophone arrays attached to the inner surface of said sonar window;
   a primary transducer located within said sonar window;
   a multiplexer attached to said plurality of hydrophone arrays;
   a data bus connected to said multiplexer;
   a first beamformer, attached to said data bus, for intercepting acoustic signals emitted by a target;
   a first signal-processing unit connected to and receiving data signals from said first beamformer;
   an automatic alert device connected to any receiving data signals from said first signal processing unit;
   a first display unit connected to and receiving data signals from said first signal processing unit;
   a second beamformer, attached to said data bus, for processing passive sonar signals;
   a digital beam steering unit connected to and receiving data signals from said second beamformer;
   a second narrow-band digital signal processing unit;
   a second display unit connected to and receiving data from both said digital beam steering unit and said narrow-band digital signal processing unit;

a third beamformer, attached to said data bus, for processing active fundamental frequency signals;

a plurality of fundamental frequency receivers connected to and receiving data signals from said third beamformer;

a plurality of third signal processors connected to and receiving data signals from said plurality of fundamental frequency receivers;

a fourth beamformer, attached to said data bus, for processing active second harmonic frequency signals;

a plurality of harmonic frequency receivers connected to and receiving data signals from said fourth beamformer;

a plurality of fourth signal processors connected to and receiving data from said plurality of harmonic frequency receivers;

a combiner/processor connected to and receiving data from both third and fourth signal processors; and a third display unit connected to and receiving data signals from said plurality of third signal processors, from said plurality of fourth signal processors, and from said combiner/processor.

19. A multiple-frequency sonar system as in claim 18 wherein said plurality of hydrophone arrays comprises five arrays located at an aft side location and a center side location on the outer surfaces of both sides of said rubber sonar window and located on a forward section of said rubber sonar window.

20. A multiple-frequency sonar system as in claim 19 wherein each of said hydrophone arrays further comprises a series of miniature hydrophones arranged in vertical and horizontal rows.

* * * * *